United States Patent Office 3,396,193
Patented Aug. 6, 1968

3,396,193
HALOGENATED CIS-CINNAMIC ACIDS
Louis Freedman, New York, and A Jay Merritt, New Rochelle, N.Y., assignors to U.S. Vitamin & Pharmaceutical Corporation, a corporation of Delaware
No Drawing. Continuation-in-part of application Ser. No. 240,152, Nov. 26, 1962, which is a continuation-in-part of application Ser. No. 857,497, Dec. 7, 1959. This application July 1, 1965, Ser. No. 468,966
7 Claims. (Cl. 260—521)

ABSTRACT OF THE DISCLOSURE

Halogenated cis-cinnamic acids of the formula

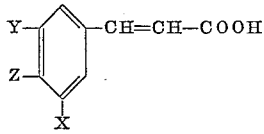

wherein X is halogen, Y is hydrogen or halogen and Z is hydrogen or hydroxy are prepared by irradiating with ultra violet light the corresponding trans-cinnamic acid. The compounds reduce capillary fragility and inflammation. Preferably, the halogen is a chlorine or bromine.

---

This application is a continuation-in-part of our application Ser. No. 240,152, filed Nov. 26, 1962, now abandoned, which was a continuation-in-part of our application Ser. No. 857,497, filed Dec. 7, 1959, and now U.S. Patent No. 3,068,148.

This invention relates to halogenated cis-cinnamic acid compounds, to a process of preparing the same, to compositions having extraordinary activity against increased capillary permeability and fragility commonly associated with inflammatory conditions, and to processes for administering such compounds to prevent, alleviate or treat inflammatory processes.

The blood capillary system, comprising thousands of fine capillaries, performs an important function in supplying blood to and removing waste products from the various organs and tissues of the body. Thus, normality of the capillary system is important to health. Impairment of the capillary system as manifested by an increase in capillary permeability and fragility, is generally recognized as a primary factor in the genesis of the inflammatory process. Abnormal tendency to form hematomas (black and blue areas under the skin) from even slight blows on the arms, legs or body and abnormal bleeding of the gums are often cited as examples of capillary fragility. Thus, abnormal hemorrhagic conditions may result from or even aggravate an inflammatory process.

We have found that halogenated cis-cinnamic acids have potent activity in reducing increased capillary permeability and fragility associated with inflammatory conditions.

Although some publications and patents (Papa et al., U.S. Patent No. 2,528,542, Wheeler et al., Am. Chem. J. 43, 14–18 (1910), Dey et al., J. Chem. Soc. 125, 561–62 (1924)) have disclosed a number of halogenated cinnamic acid derivatives, these known derivatives, unlike the halogenated cis-cinnamic acids of the present invention, are trans-cinnamic acid derivatives. While the above-mentioned publications do not explicitly state that the cinnamic acid derivatives disclosed therein are derivatives of trans-cinnamic acids, it is well known that the trans isomers of cinnamic acid are the more stable forms and are the forms obtained using the standard methods of preparing cinnamic acids. By contrast with the corresponding cis-cinnamic acid derivatives, the trans-cinnamic acids display relatively little activity in reducing increased capillary permeability and fragility associated with inflammatory conditions.

The halogenated cis-cinnamic acid compounds of the invention have a nucleus of the following formula:

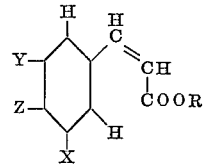

In this nucleus, X is halogen, such as chlorine, fluorine, bromine or iodine, Y is hydrogen, hydroxy, halogen, lower alkyl or lower alkoxy, Z is hydrogen, lower alkoxy, or hydroxy, and is preferably hydroxy, and R is hydrogen, lower alkyl, aryl or aryl lower alkyl, preferably hydrogen or lower alkyl.

When R is hydrogen, the compounds are the acids. It will be understood that the term "acid compound" as used herein is inclusive of the salts, such as the non-toxic alkali and alkaline earth metal salts, e.g., the sodium, potassium, lithium, calcium and magnesium salts, the ammonium salts, and other non-toxic salts, including the organic amine salts.

Included within the above formula are halogenated cis-cinnamic acids, halogenated cis- m- and p-coumaric acids, halogenated cis-caffeic acids, halogenated cis-ferulic acids, and halogenated cis-isoferulic acids and their alkyl, aryl lower alkyl and aryl esters. The halogenated p-hydroxy cis-cinnamic acid compounds are preferred.

The following compounds are exemplary of the halogenated cis-cinnamic acids coming within the invention:

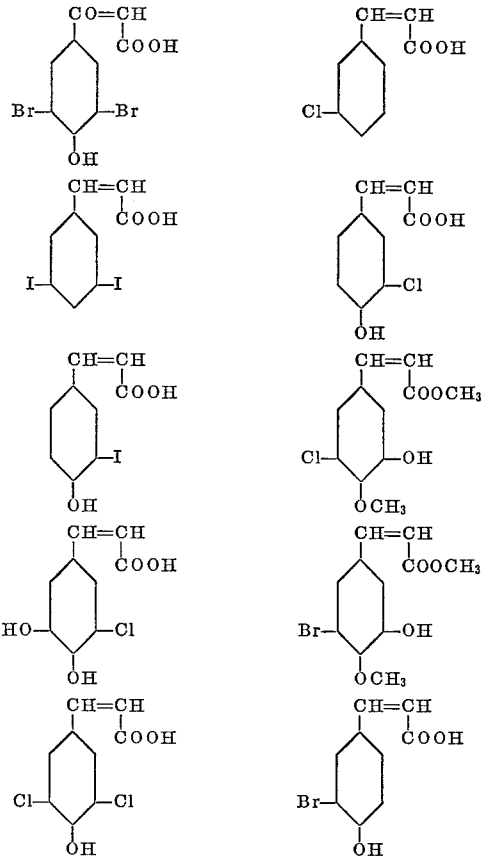

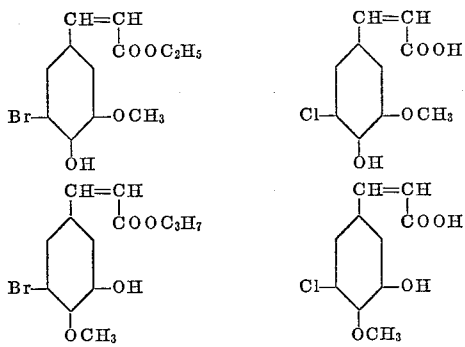

In accordance with our invention we prepare the halogenated cis-cinnamic acids by irradiating with ultra-violet light a trans-cinnamic acid of the formula

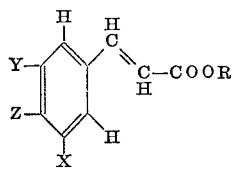

wherein R, X, Y and Z are the same as above. The intermediate trans-isomers of the halogenated cis-cinnamic acids are prepared by conventional methods of chemical synthesis.

The following examples illustrate the procedure used for the preparation of typical halogenated cis-cinnamic acid compounds of the invention.

EXAMPLE 1

3-chloro-trans-p-coumaric acid, melting point 182 to 183° C. (66 grams) was dissolved in 100 ml. of 3 N NaOH. The solution was brought to 1000 ml. by addition of water and filtered. The filtrate was then irradiated by circulation at a rate of 300 ml. per minute through a quartz well exposed to a Hanovia high pressure mercury vapor lamp Model No. 79A fitted with a Corex D filter sleeve to remove all light below 2850A.

The solution was exposed to the lamp for 3½ hours, and then brought to a pH of 4.5 by addition of 24 ml. of concentrated hydrochloric acid. A precipitate of unisomerized trans-acid formed, and this was removed by filtration. The filtrate was concentrated under reduced pressure until crystallization of the cis-acid had occurred, and allowed to stand overnight in a refrigerator. The crystalline cis-product was recovered by filtration obtaining 1.75 grams of 3-chloro-cis-p-coumaric acid, melting point 102–105° C., absorption in 0.1 N NaOH, maximum 293 mμ, $E_{1\,cm.}^{1\%}$ 720, minimum 225 mμ, $E_{1\,cm.}^{1\%}$ 238

EXAMPLE 2

3,5-dichloro-trans-p-coumaric acid, melting point 245–247° C. (77.6 grams) was dissolved in 200 ml. of 3 N NaOH and the solution brought to 1000 ml. with water. The solution was filtered, and then irradiated using the same conditions as set forth in Example 1.

After 3.5 hours of exposure the solution was brought to a pH of 4.5 by addition of hydrochloric acid. The resulting precipitate, 3,5-dichloro-trans-p-coumaric acid, was removed by filtration. Concentrated hydrochloric acid was added to the filtrate to bring the pH to 1.5, thereby precipitating the desired 3,5-dichloro-cis-p-coumaric acid, which was separated by filtration. A yield of 16 grams was obtained, melting point 167–172° C., absorption in 0.1 NaOH maximum 295 mμ, $E_{1\,cm.}^{1\%}$ 620 minimum 258 mμ, $E_{1\,cm.}^{1\%}$ 140

EXAMPLE 3

3,5-dibromo-trans-p-coumaric acid (214.6 grams) was dissolved in 2 liters of 5% NaOH. The solution was filtered and the filtrate was irradiated using the same lamp and under the same conditions as in Example 1.

After exposure for 10 hours the solution was brought to a pH of 4.5 by the addition of concentrated hydrochloric acid, and the resulting precipitate of 3,5-dibromo-trans-p-coumaric acid was separated by filtration. Additional hydrochloric acid was added, bringing the pH to 2.5, whereupon the 3,5-dibromo-cis-p-coumaric acid precipitated and was separated by filtration. A yield of 48 grams was obtained, melting point 152–155° C., absorption in 0.1 N NaOH max. 298 mμ, $E_{1\,cm.}^{1\%}$ 460 min. 260 mμ, $E_{1\,cm.}^{1\%}$ 165

EXAMPLE 4

3-iodo-trans-p-coumaric acid (45.3 grams) was dissolved in 1 liter of 5% aqueous NaOH. The solution was filtered and irradiated under the conditions set forth in Example 1.

After 6 hours of exposure the solution was brought to a pH of 4.5 by addition of concentrated hydrochloric acid. The resulting precipitate of 3-iodo-trans-p-coumaric acid was separated by filtration. Additional concentrated hydrochloric acid was then added, bringing the pH to 2.5, whereupon the desired 3-iodo-cis-p-coumaric acid precipitated. The yield was 2.75 grams of a product melting at 115–121° C., absorption in 0.1 N NaOH max. 295 mμ, $E_{1\,cm.}^{1\%}$ 500 min. 260 mμ, $E_{1\,cm.}^{1\%}$ 195

EXAMPLE 5

3,5-diiodo-trans-p-coumaric acid (46.0 grams) was dissolved in 1000 ml. of aqueous NaOH. The solution was filtered and then irradiated under the conditions set forth in Example 1.

After 6 hours of exposure, the solution was brought to a pH of 4.5 by addition of concentrated hydrochloric acid. The 3,5-diiodo-trans-p-coumaric acid which separated was removed by filtration. Additional concentrated hydrochloric acid was added, bringing the pH to 2.5, whereupon the desired 3,5-diiodo-cis-p-coumaric acid precipitated. A yield of 2.5 grams was obtained, absorption in 0.1 N NaOH max. 318 mμ, $E_{1\,cm.}^{1\%}$ 395 min. 275 mμ, $E_{1\,cm.}^{1\%}$ 220

EXAMPLE 6

200.8 grams of NaOH was dissolved in 5.5 liters of water. The solution was cooled, and while stirring slowly 437.1 grams of 3-bromo-trans-p-coumaric acid was added. Stirring was continued until solution was complete, whereupon water was added to a total volume of 6.0 liters. The solution was filtered and the filtrate irradiated as in Example 1 for 23 hours.

The irradiated solution was brought to pH 5.0 with concentrated HCl. 3-bromo-trans-p-coumaric acid precipitated, and was removed by filtration. The filtrate was brought to pH 2.5 by concentrated HCl. 3-bromo-cis-p-coumaric acid precipitated, and was recovered by filtration, and recrystallized from 2500 ml. of water.

The recrystallized product was separated by filtration, washed with water, and dried in vacuo at 45° C. Yield=69 grams, 3-bromo-cis-p-coumaric acid, M.P. 88° C.–92° C., abs. max. 298 mμ, $E$=13,850; min. 258 mμ, $E$=4130 (0.1 N NaOH).

The halogenated cis-cinnamic acid compounds of the invention can be administered directly, but are usually best administered with the aid of a carrier, which can be water or an organic solvent, or other liquid diluent, such as a cream or emulsion base of convetnional formulation, or a solid carrier, such as is used in the formulation of tablets. Such compositions can be formulated so as to be administrable orally, parenterally, topically, or by any other suitable method.

The concentration of the halogenated cis-cinnamic acid compounds in these compositions is not in any way critical, but can be adjusted to meet the requirements. In general, the concentration for oral and parenteral administration lies within the range from about 0.1 to about 100 mg. per unit dosage, i.e., per cc. of solution, or per tablet or capsule, and for topical administration within the range from about 0.01 to 2.5% by weight of the composition. However, larger amounts up to about 10% can be used, if desired.

The following examples illustrate various types of compositions coming within the invention, and a variety of administration techniques.

Example I

A composition of matter for oral administration in animals, comprising 3-chloro-cis-p-coumaric acid as the active anti-inflammatory ingredient in combination with a suitable carrier, was prepared by thoroughly mixing together 1000 grams of 3-chloro-cis-p-coumaric acid and 3500 grams of beta-lactose (milk sugar), passing the blended mixture through a No. 40 screen and filling the mix into gelatin capsules, 450 mg. per capsule, each capsule to contain 100 mg. of 3-chloro-cis-p-coumaric acid.

Though the dose may be varied, depending on the age and weight of the individual, and the degree and nature of the inflammation to be treated, in general, from about 0.1 to 800 mg. of the active ingredient per day in divided doses has given satisfactory response; and a composition can be in tablet or solution as indicated by the following examples.

Example II

A composition of matter for oral administration to animals, in tablet form, comprising 3,5-dichloro-cis-p-coumaric acid as the active anti-inflammatory ingredient, in combination with a suitable carrier, was prepared by compounding the following ingredients into a tablet mix:

| | Grams |
|---|---|
| 3,5-dichloro-cis-coumaric acid | 300 |
| Sugar | 308 |
| Lactose | 177 |
| Starch | 98 |
| Dextrin | 50 |
| Talcum | 10 |
| Stearic acid | 10 |
| Starch paste Q.s. to make 1000 | |

The above mix was compressed into tablets, weighing approximately 325 mg., each tablet containing about 100 mg. of 3,5-dichloro-cis-p-coumaric acid.

p-Chloro-cis-cinnamic acid, p-bromo-cis-cinnamic acid, p-iodo-cis-cinnamic acid, m-chloro-cis-cinnamic acid, m-bromo-cis-cinnamic acid, 3,5-diiodo-cis-cinnamic acid, 3-iodo-cis-p-coumaric acid, 3,5-dichloro-cis-cinnamic acid, 3,5-dibromo-cis-coumaric acid and 3,4-dibromo-cis-cinnamic acid were substituted for the 3,5-dichloro-cis-p-coumaric acid. Satisfactory tablets were obtained. Similarly, 5-chloro-cis-caffeic, 5-chloro-cis-ferulic and 5-chloro-cis-isoferulic acids can be used.

Example III

A composition of matter for parenteral administration comprising 3-chloro-cis-p-coumaric acid as the active anti-inflammatory ingredient in combination with a liquid carrier and having the following formula was prepared:

| | Grams |
|---|---|
| 3-bromo-cis-p-coumaric acid | 25 |
| Sodium hydroxide | 5.74 |
| Benzyl alcohol | 5 |
| Water pyrogen-free, Q.s. to make 500 ml. | |

In making this solution the cis-p-coumaric acid was dissolved in 400 ml. of pyrogen-free water containing the sodium hydroxide, the benzyl alcohol added, and the solution was made up Q.s. to 500 ml; after which the solution was filtered aseptically and filled aseptically in ampules containing 1 ml.; under a nitrogen atmosphere. The resulting solution supplied a dosage unit of 50 mg. of 3-chloro-cis-p-coumaric acid. Here, again, the example is illustrative, since the composition of the active ingredient may be varied as desired to obtain other dosage forms in which case the sodium hydroxide is to be included in stoichiometric quantities.

Example IV

A cream for topical administration comprising 3,5-dibromo-cis-p-coumaric acid as the active anti-inflammatory ingredient in combination with a cream base was prepared according to the following formulation:

| | Grams |
|---|---|
| Cetyl alcohol | 150 |
| Spermaceti | 50 |
| Methyl paraben | 1.50 |
| Propyl paraben | 0.90 |
| Glycerine | 50 |
| Water | 737 |
| 3,5-dibromo-cis-p-coumaric acid | 0.50 |
| Duponol-C (sodium lauryl sulfate) | 10 |
| Sodium hydroxide | 0.12 |

This composition was prepared by heating cetyl alcohol, spermaceti, methyl paraben and propyl paraben in the amounts set forth to 70° C. with stirring until a uniform mix was obtained. Sodium hydroxide was dissolved in 160 ml. of water and 0.5 g. 3,5-dibromo-cis-p-coumaric acid added with stirring until solution was complete. To this solution was added Duponol-C and 577 g. of water, after which the mixture was heated to 70° C. with stirring. The mixture was then added to the solution first prepared at 70° C. with stirring, and stirring continued until the cream cooled to room temperature. The resulting cream contained 0.05% 3,5-dibromo-cis-p-coumaric acid and was useful for therapeutic administration to control inflammation.

Example V

Example IV was repeated to include 20 g. of d-pantothenylol in the 3,5-dibromo-cis-p-coumaric acid solution. The resulting product contained 2% d-pantothenyl alcohol and 0.05% 3,5-dibromo-cis-p-coumaric acid.

Example VI

A cream for topical application was prepared having the following formulation:

| | Grams |
|---|---|
| Methyl paraben | 1.50 |
| Propyl paraben | 0.90 |
| Stearyl alcohol | 170 |
| Protopet (petrolatum) | 170 |
| Propylene glycol | 120 |
| Myrj-52 (polyoxyl 40 stearate) | 50 |
| Neomycin sulfate | 5 |
| d-Pantothenylol | 20 |
| 3-bromo-cis-p-coumaric acid | 0.50 |
| Sodium hydroxide | 0.12 |
| Water | 452 |

The methyl paraben, propyl paraben, stearyl alcohol and Protopet were mixed together and heated with stirring to 70° C. to form a uniform mix. 427 ml. of water, the sodium hydroxide, propylene glycol, 3-bromo-cis-p- coumaric acid, Myrj-52 and d-pantothenylol were mixed together and heated with stirring to 70° C. The two solutions were then mixed at 70° C. and allowed to cool to 60° C., after which the neomycin sulfate was added, in solution in the remainder of the water. The stirring was continued until the mixture reached room temperature.

Sodium hypophosphite (0.2%) and sodium bisulfite (0.2%) may be added to this composition to prevent discoloration of the neomycin.

Example VII

A cream for topical application was prepared having the following formulation:

| | Grams |
|---|---|
| Cetyl alcohol | 150 |
| Spermaceti | 50 |
| Methyl paraben | 1.50 |
| Propyl paraben | 0.90 |
| Arlacel 161 (glyceryl monostearate) | 7.25 |
| Glycerine | 50 |
| d-Pantothenylol | 20 |
| Water | 671.98 |
| Myrj-52 (polyoxyl 40 stearate) | 42.75 |
| Neomycin sulfate | 5 |
| 3,5-dichloro-cis-p-coumaric acid | 0.50 |
| Sodium hydroxide | 0.12 |

The cetyl alcohol, spermaceti, methyl paraben, propyl paraben, and Arlacel 161 were weighed into a suitable vessel, and heated to 70° C., with stirring, until a uniform mix was obtained. 621 ml. of water, the sodium hydroxide, 3,5-dichloro-cis-p-coumaric acid, glycerine, d-pantothenylol and Myrj-52 were mixed together, and heated with stirring to 70° C. The two solutions were then mixed at 70° C. with stirring and allowed to cool to 60° C. The neomycin sulfate was then dissolved in the remainder of the water and added to the solution at 60° C., while stirring was continued until the solution reached room temperature.

Sodium hypophosphite (0.2%) and sodium bisulfite (0.2%) may be added to prevent discoloration of the neomycin.

The creams of Examples VI and VII may be made without addition of the d-pantothenylol. In this event, the amount of water is increased by the amount equal to the weight of d-pantothenylol removed.

Creams containing from 0.01% and 2.5% halogenated cis-p-coumaric acid may be prepared by this procedure by adjusting the weight of sodium hydroxide in stoichiometric proportion to the weight of the cis-p-coumaric acid, and either adding or removing the equivalent amount of water from the formulation.

Example VIII

An ophthalmic solution for application to the eyeball was prepared according to the following formulation:

| | Grams |
|---|---|
| d-Pantothenylol | 10 |
| Neomycin sulfate | 5 |
| 3,5-dichloro-cis-p-coumaric acid | 0.2 |
| Sodium borate | 10 |
| Boric acid | 10 |
| Sodium hypophosphite | 2 |
| Sodium bisulfite | 2 |
| Tween 80 (sorbitan monolaurate) | 2 |
| Benzalkonium chloride | 0.2 |
| Distilled water | 958.6 |

The Tween 80, d-pantothenylol, sodium bisulfite, sodium hypophosphite, sodium borate, boric acid, 3,5-dichloro-cis-p-coumaric acid, neomycin and benzalkonium chloride were dissolved in water in the order named. The resulting solution was then filtered aseptically by the standard procedure for handling solutions for ophthalmic use.

This information may be modified by eliminating either the d-pantothenylol or the neomycin sulfate or both, replacing them with an equal weight of water.

Example IX

A composition suitable for use as a nasal drop was prepared having the following formulation:

| | Grams |
|---|---|
| Phenylephrine hydrochloride | 2.50 |
| 3,5-dibromo-cis-p-coumaric acid | 0.50 |
| Sodium dihydrogen phosphate dihydrate | 1.53 |
| Sodium phosphate dibasic heptahydrate | 1.34 |
| Methyl paraben | 0.90 |
| Propyl paraben | 0.10 |
| Distilled water, q.s. to 1000 ml. | |

The sodium dihydrogen phosphate dihydrate and sodium phosphate dibasic heptahydrate were dissolved in approximately 800 ml. of water. The phenylephrine hydrochloride, 3,5-dibromo-cis-p-courmaric acid, methyl paraben and propyl paraben were added and the solution stirred until they had dissolved. Distilled water was then added to a total volume of 1000 ml. This composition contained 0.05% 3,5-dibromo-cis-p-coumaric acid.

Compositions of matter similar to those described under Examples I to IX may be made by including other substances having therapeutic properties which enhance the total therapeutic value of the halogenated cis-cinnamic acid compound by their additive or by a synergistic effect.

The halogenated cis-cinnamic acid compounds of the invention have been found to be extremely potent when assessed in guinea pigs by the method of Ungar et al., Archives Internationales de Pharmacodynamie et Therapie, 123 71 (1959). The anti-inflammatory unit is defined as the amount of material per kilogram of body weight of the guinea pig which causes a 25% reduction of the swelling under the conditions of the method and the route of administration. The assay work was carried out with the halogenated cis-cinnamic acids given in Table I which follows:

| Compound—Halogenated-cis-Cinnamic Acid | Anti-Inflammatory Potency | |
|---|---|---|
| | Units/ gram | Units/ millimole |
| 3-chloro-cis-p-coumaric acid | 25,000 | 4,965 |
| 3,5-dichloro-cis-p-coumaric acid | 20,000 | 4,661 |
| 3-bromo-cis-p-coumaric acid | 445,000 | 99,500 |
| 3,5-dibromo-cis-p-coumaric acid | 20,000 | 6,439 |
| 3-iodo-cis-p-coumaric acid | 10,000 | 2,900 |
| 3,5-diiodo-cis-p-coumaric acid | 6,700 | 2,790 |
| Cis-p-coumaric acid (control) | 10,000 | 1,640 |

The extraordinary anti-inflammatory potency of the halogenated cis-p-coumaric acid compounds of the invention is emphasized by the comparison with cis-p-coumaric acid, which is set forth in the table as a control. The compounds of the invention are 2 to 2½ times as potent as cis-p-coumaric acid in terms of units per gram and 2 to 4 times as effective in terms of units per millimole, a more effective comparison, since it is in terms of molecular weight.

The above examples are set forth by way of illustration only, and it is to be understood that it is here intended to cover all changes and modifications of the examples herein which do not constitute departures from the spirit and scope of the invention.

We claim:
1. A halogenated cis-cinnamic acid of the formula

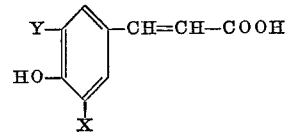

wherein X is halogen and Y is hydrogen or halogen.
2. A compound in accordance with claim 1 wherein Y is halogen.
3. A compound in accordance with claim 2, wherein X and Y are chlorine.
4. A compound in accordance with claim 2, wherein X and Y are bromine.

5. A compound in accordance with claim 1, wherein Y is hydrogen.

6. A compound in accordance with claim 5, wherein X is chlorine.

7. A compound in accordance with claim 5, wherein X is bromine.

References Cited

Paal et al., Berichte, 29: 2306–2307 (1896).

LORRAINE A. WEINBERGER, *Primary Examiner.*

D. STENZEL, *Assistant Examiner.*